United States Patent
Chen et al.

(10) Patent No.: US 9,615,471 B2
(45) Date of Patent: Apr. 4, 2017

(54) COMPONENT CARRIER

(71) Applicant: Quanta Computer Inc., Taoyuan (TW)

(72) Inventors: Chao-Jung Chen, Taoyuan (TW); Yaw-Tzorng Tsorng, Taoyuan (TW); Chun Chang, Taoyuan (TW); Chen Tseng, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 27 days.

(21) Appl. No.: 14/723,053

(22) Filed: May 27, 2015

(65) Prior Publication Data

US 2016/0353591 A1    Dec. 1, 2016

(51) Int. Cl.
  *G06F 1/20* (2006.01)
  *H05K 5/02* (2006.01)
  *H05K 7/02* (2006.01)
(52) U.S. Cl.
  CPC ............. *H05K 5/0204* (2013.01); *H05K 7/02* (2013.01)
(58) Field of Classification Search
  CPC  G06F 1/20; G06F 1/203; G06F 1/188; H05K 5/0204; H05K 7/02; H02K 5/00; F16M 7/00

USPC ................ 248/674; 361/679.46, 679.48, 688
IPC .......................................................... H02K 5/00
See application file for complete search history.

(56) References Cited

U.S. PATENT DOCUMENTS

| | | | | |
|---|---|---|---|---|
| 2014/0306087 A1* | 10/2014 | Tian | ........................ | F16M 13/02 248/674 |
| 2014/0362515 A1* | 12/2014 | Pronozuk | ............. | H05K 7/1488 361/679.31 |
| 2016/0183401 A1* | 6/2016 | Chen | ........................ | G06F 1/16 361/679.39 |

\* cited by examiner

*Primary Examiner* — Todd M Epps
(74) *Attorney, Agent, or Firm* — Nixon Peabody LLP

(57) ABSTRACT

An apparatus having a component carrier assembly configured for supporting a component. The component carrier assembly having a first mating element and a connector assembly. The connector assembly including a connector communicatively coupled to the component and a second mating element. The first mating element is configured to operably engage with the second mating element to rotationally and slidably couple the component carrier assembly to the connector assembly.

21 Claims, 7 Drawing Sheets

COMPONENT CARRIER

FIELD

The subject matter herein generally relates to component carriers. More specifically, the subject matter herein relates to component carriers configured to transition from one configuration to another.

BACKGROUND

Known component carriers allow securing components to various necessary structures including printed circuit boards of electronic devices. Component carriers secure the component during assembly of electronic devices. As electronic devices become smaller, the working space available for assembling and securing components within electronic devices decreases. Existing component carriers require additional operating space during assembly often leading to an increased overall size of the electronic device.

BRIEF DESCRIPTION OF THE DRAWINGS

Implementations of the present technology will now be described, by way of example only, with reference to the attached figures, wherein.

DETAILED DESCRIPTION

Figure 1:
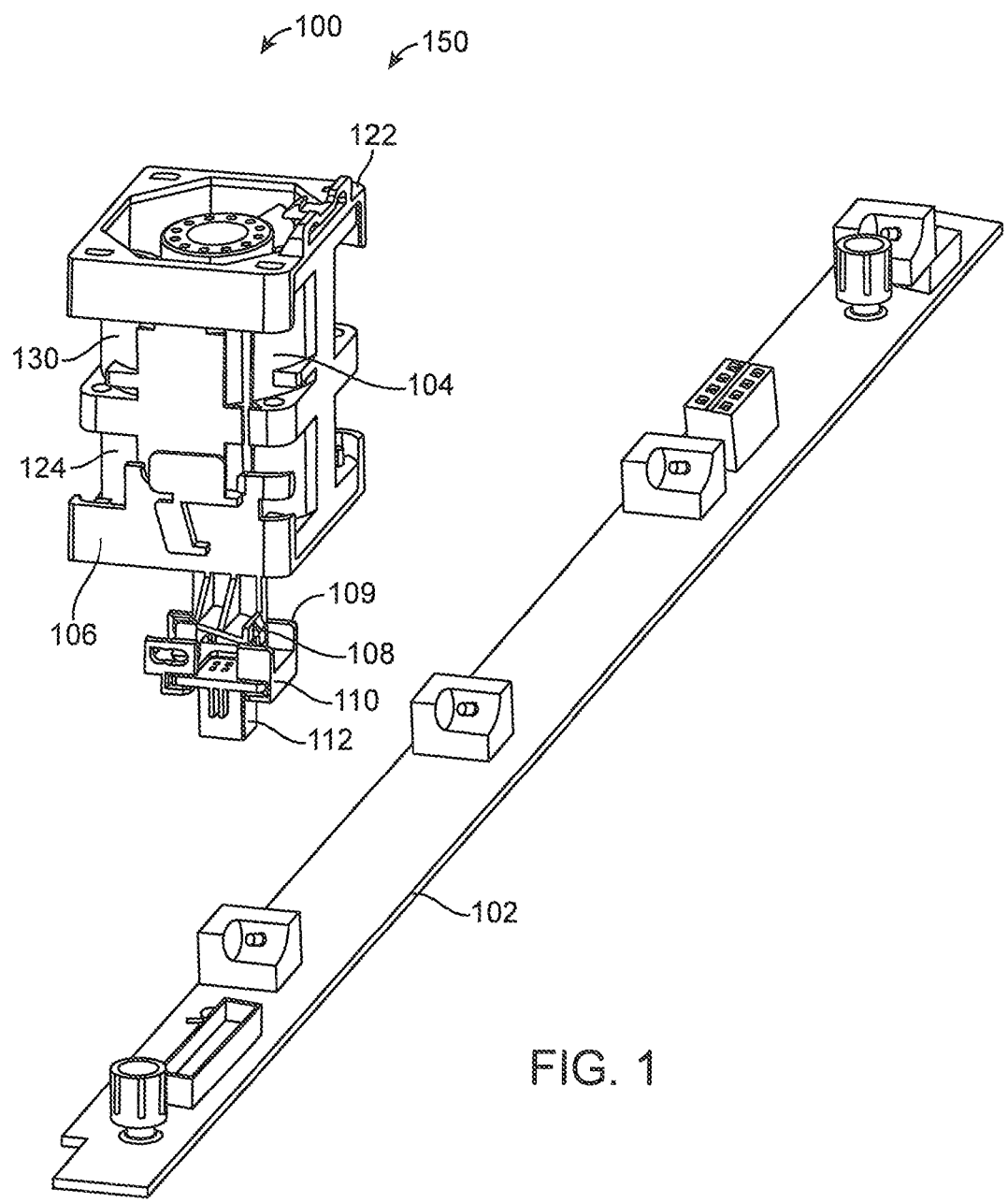
FIG. 1 is an isometric view of an example embodiment of a fan carrier assembly in a first configuration.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Electronic devices including servers, blade servers, and personal computers have become more common place in daily life. These devices have progressively become smaller as technology has reduced the size of individual components.

The present disclosure is related to an apparatus having a component carrier assembly configured for supporting a component. The component carrier assembly can have a first mating element and a connector assembly. The connector assembly can include a connector communicatively coupled to the component and a second mating element. The first mating element is configured to operably engage with the second mating element to rotationally and slidably couple the component carrier assembly to the connector assembly. The component carrier assembly can be configured to transition from a first configuration to a second and third configuration. The first configuration can include the component carrier assembly substantially longitudinally aligned with respect to each individual element. The second configuration can include the connector assembly rotated relative to the second mating element. The third configuration can include the connector assembly laterally displaced relative to the second mating element.

FIG. 1 illustrates an example embodiment of a component carrier assembly 100 in a first configuration 150. The component carrier assembly 100 can be configured to be securely coupled with a component board 102. The component board 102 can matingly receive at least one component carrier assembly 100. In at least one embodiment, the component board 102 is a printed circuit board. In alternative embodiments, the component board 102 can be a flexible circuit ribbon, a breadboard, or a strip board. In yet other embodiments, the component carrier assembly 100 can be configured to securely couple with the interior housing or frame of an electronic device.

The component carrier assembly 100 can include a bracket 106 and a connector frame 110. The first configuration 150 can be the component carrier assembly 100 substantially longitudinally aligned. A first end of the component 104 to be mounted can be configured to be received in the bracket 106. The component carrier assembly 100 can also include a second bracket 122 configured to receive a second end 130 of the component 104. The bracket 106 can include a connecting member 108 configured operably engage with a connector assembly 109 including a connector frame 110 and a component board coupler 112 to engage the board 102. In particular, the connecting member 109 can operably engage with the connector frame 110. The connector frame 110 can further be configured to receive the component board coupler 112. The component board coupler 112 can allow the carrier assembly 100 to be secured to the board 102. The component board coupler 112 can also allow the component 104 to be communicatively coupled to the board 102. Communicatively coupling can include electrical, mechanical and optical coupling configured to allow the carrier assembly 100 to communicate with the board 102. In at least one embodiment, the component board coupler 112 can include a pin arrangement configured to communicatively couple the component 104 with the board 102. In an alternative embodiment, the component board coupler 112 can include a tongue and groove arrangement configured communicatively couple the component 104 with the board 102. Each of the tongue and the groove can have an electrical contact configured to electrically connect when the tongue is securely received in the groove. In yet other embodiments, the component board coupler 112 can couple the component carrier assembly 100 with the board 102 and the component 104 can be communicatively coupled to the board 102 via wiring.

Figure 3:
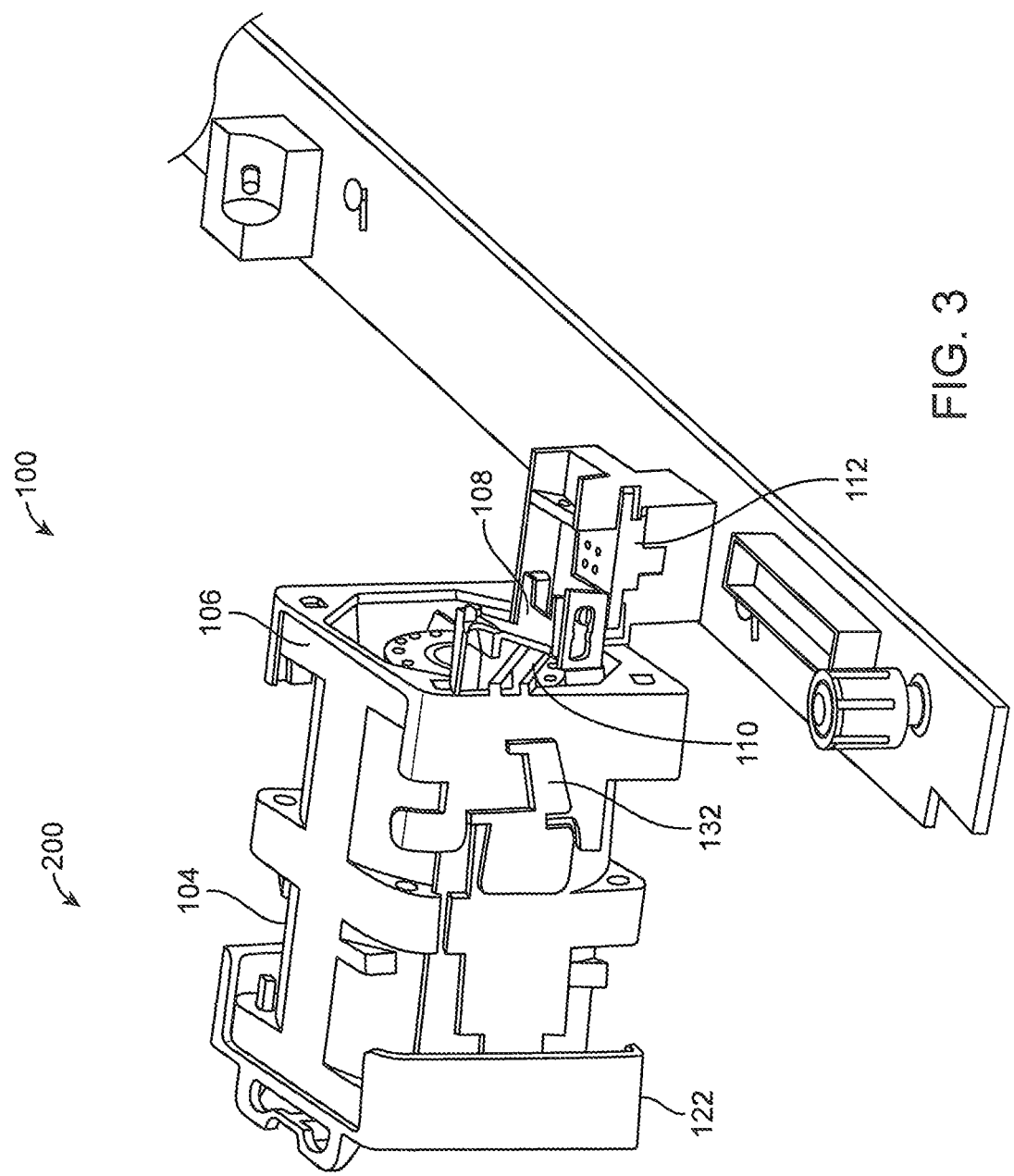
FIG. 3 is an isometric view of an example embodiment of a fan carrier assembly in a second configuration.
Figure 5:
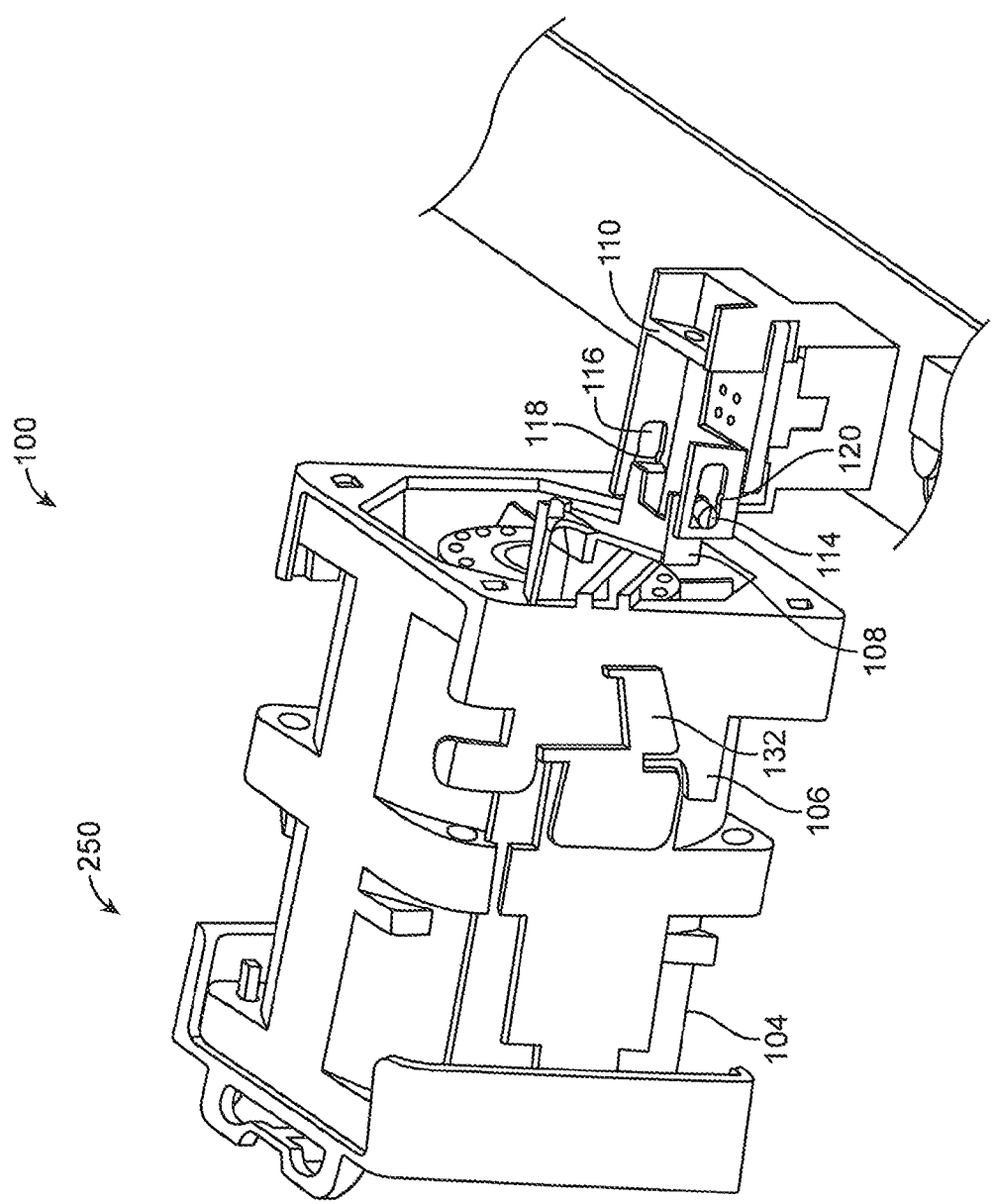
FIG. 5 is a isometric view of an example embodiment of a fan carrier assembly in a third configuration.

The operable engagement between the connecting member 108 and the connector frame 110 can allow the component carrier assembly 100 to transition from the first configuration 150 to a second configuration 200, as shown in FIG. 3, and a third configuration 350, as shown in FIG. 5. In the second configuration 200, the component carrier assembly 100 can be rotated relative to the connector assembly 109, so that component 104 is reoriented in a direction perpendicular to its direction in the first configuration 100. In the third configuration 250, the component carrier assembly 100 can be laterally displaced relative to the connector assembly 109. In some embodiments, the connector frame 110 and the connecting member 108 can be configured so that this lateral displacement secures the carrier assembly in a secured position, as discussed below in greater detail with respect to FIG. 5.

Figure 2:
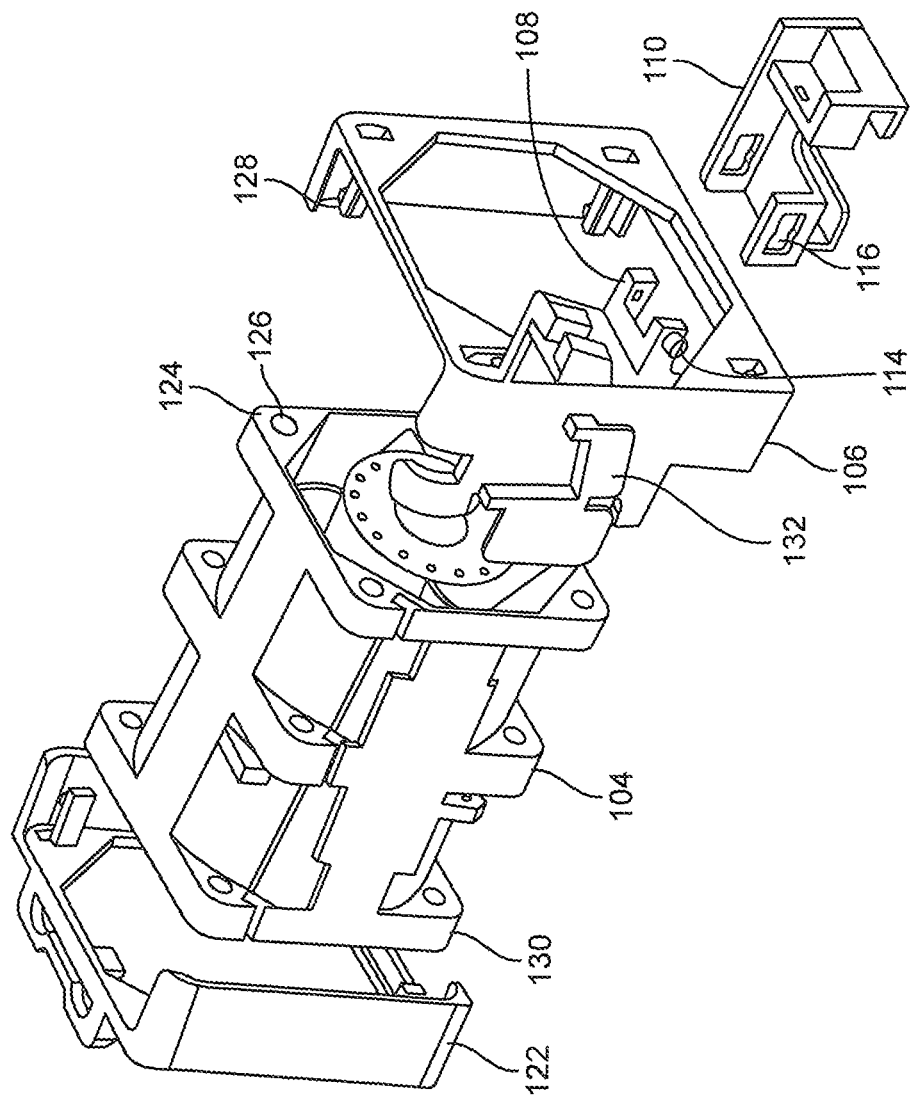
FIG. 2 is an exploded view of an example embodiment of a fan carrier assembly in a second configuration.

FIG. 2 illustrates an exploded view of an example embodiment of the component carrier assembly 100, the connector frame 110, and the component 104 in a second configuration 200. In the illustrated embodiment, the component 104 is a fan module. In alternative embodiments, the component 104 can be configured to be a housing containing other components including, but not limited to, a heat sink, a processor, and a data storage device. The component 104 can be made from any suitable material for the specific component being housed.

As noted above, the bracket 106 can be configured to receive the first end 124 of the component 104. The bracket 106 can be made of similar materials as the component 104 or any other suitable material. In at least one embodiment, the bracket 106 is made of plastic. The design and configuration of the bracket 106 can vary depending on the component being used. The bracket 106 can be configured to support the weight of the component 104 while not impeding the function of the component 104. As can be appreciated in FIG. 2, the bracket 106 is configured to support a fan housing while not impeding air movement generated by the fan.

The bracket 106 and first end 124 of the component 104 can be secured together using screws, snap fit connects, a pressure fit, or a similar fastening arrangement. In at least one embodiment, the component 104 can have a plurality of apertures 126 formed in the first end 124. The plurality of apertures 126 can receive a securing member 128 of the bracket 106. The securing member 128 can be configured to be inserted into the plurality apertures 126, thereby securing the component 104 and the bracket 106 to each other.

The bracket 106 can include a connecting member 108 configured to operably couple the bracket 106 with a connector frame 110. The connecting member 108 can rotationally and slidably couple with the connector frame 110. The operable coupling between the bracket 106 and the connector frame 110 can allow the assembly 100 to transition from a first configuration 150 to the second configuration 250 and the third configuration 300. The connecting member 108 can include at least one protrusion 114 extending therefrom and the connector frame 110 can have at least one groove 116 formed therein and configured to receive the at least one protrusion 114. The at least protrusion 114 and the at least one groove 116 can be shaped to allow rotation and sliding of the at least one protrusion 114 within the at least one groove 116. In some embodiments, the at least one protrusion 114 can have a substantially circular cross-section and the at least one groove can have rounded edges and have a height greater than the diameter of the protrusion 114. In alternative embodiments, the protrusion can have other cross-sectional dimensions and the groove can be shaped to accommodate the corresponding protrusion and allow rotation and lateral displacement. In yet another alternative embodiment, the connecting member 108 can have at least one groove formed therein and the connector frame 110 can have at least one protrusion extending therefrom.

In some embodiments, the connector frame 110 can further include a locking mechanism 118. The locking mechanism 118 can be configured to secure the carrier assembly 100 in the third configuration. The locking mechanism 118 can be at least one ridge 120 formed on the inner surface of the groove 116 and configured to allow the protrusion 114 to pass over. The ridge 120 can be configured to allow the protrusion 114 to pass over in both directions along the length of the groove 116, or alternatively can be configured to allow the protrusion 114 to pass over in only a single direction. In at least one embodiment, the at least one groove 116 can have a plurality of ridges 120 formed on the inner surface of each groove 116. Each ridge 120 can offer a secured position, thus allowing the carrier assembly 100 to be secured in a plurality of positions.

As can be appreciated in FIG. 2, the connecting member 108 can have two protrusions 114 extending therefrom and the connector frame 110 can have two grooves 116 formed therein. Each groove 116 has a single ridge 120 formed on the inner surface configured to secure the connecting member 108 in the third configuration 250.

In alternative embodiments, the locking mechanism can be a locking tab formed on one of the connecting member 108 and the connector frame 110 and configured to be received in a locking slot formed on another of the connecting member 108 and the connector frame 110. The locking tab can have a tip portion that increases in thickness and is configured to allow passage into the slot, but inhibit removal from the slot.

The bracket 106 can also include a cable routing mechanism 132. The cable routing mechanism 132 can allow necessary cables, such as electrical cables, to be organized and kept away from any moving parts of the carrier assembly 100. The cable routing mechanism 132 can be a plurality of securement points configured to organize the cables. In at least one embodiment, each securement point can be substantially U-shaped and configured to allow necessary cables pass through the aperture formed by the substantially U-shape. As can be appreciated in FIGS. 2 and 3, the cable routing mechanism 132 can be pathways integrally formed in the surface of the bracket 106. The pathways can receive cables therein and direct them from the component 104 to the coupler 112. The cable routing mechanism 132 can include the connecting member 108, such that the connecting member 108 can be shaped to allow cables to pass without interfering with the connecting member 108 transitioning between configurations. As can further be appreciated in FIGS. 2 and 3, the connecting member 108 can have substantially U-shaped arrangement to allow cables to pass under in a first configuration 150, and transition to a second and third configuration 200, 250 without impeding cabling. In at least one embodiment, the component 104 is a fan housing having electrical connections including power and control wires. The electrical connections can be directed through bracket 106 via the cable routing mechanism 132 to coupler 112. The coupler 112 can couple any component 104 electrical connections to the board 102, thereby allowing the fan housing to be communicatively coupled to the board 102.

Figure 4:
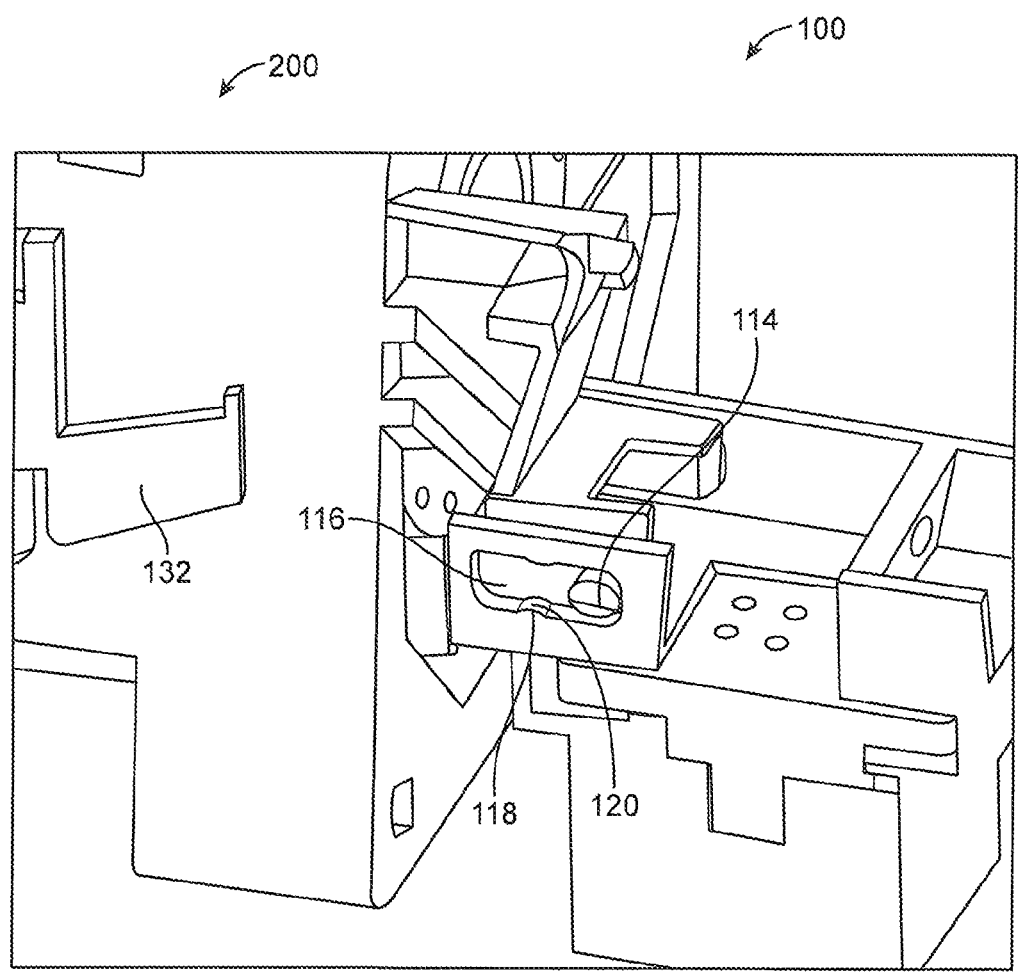
FIG. 4 is a detailed isometric view of portion AA of FIG. 3.

FIG. 3 illustrates an isometric view of an example embodiment of a component carrier assembly 100 in a second configuration. FIG. 4 illustrates a detailed isometric view of portion AA of FIG. 3. Upon coupling the component carrier assembly 100 onto the component board 102, the assembly 100 can be configured to transition from a first configuration 150 to the second configuration 200. The component 104 and component assembly 100 can rotate in place, due to the protrusions 114 engaging with the grooves 116, relative to the connector frame 110. As can be appreciated by FIGS. 3 and 4, the component 104 and component assembly 100 rotate about 90 degrees from a substantially vertical orientation to a substantially horizontal orientation. In the illustrated embodiment, the second configuration 200, the component 104 and bracket 106 are substantially parallel with the component board 102. In alternative embodiments, the transition can be a smaller angle or a larger angle and the second configuration can arrange the component 104 and component assembly 100 at various orientations relative to the component board 102.

Figure 6:
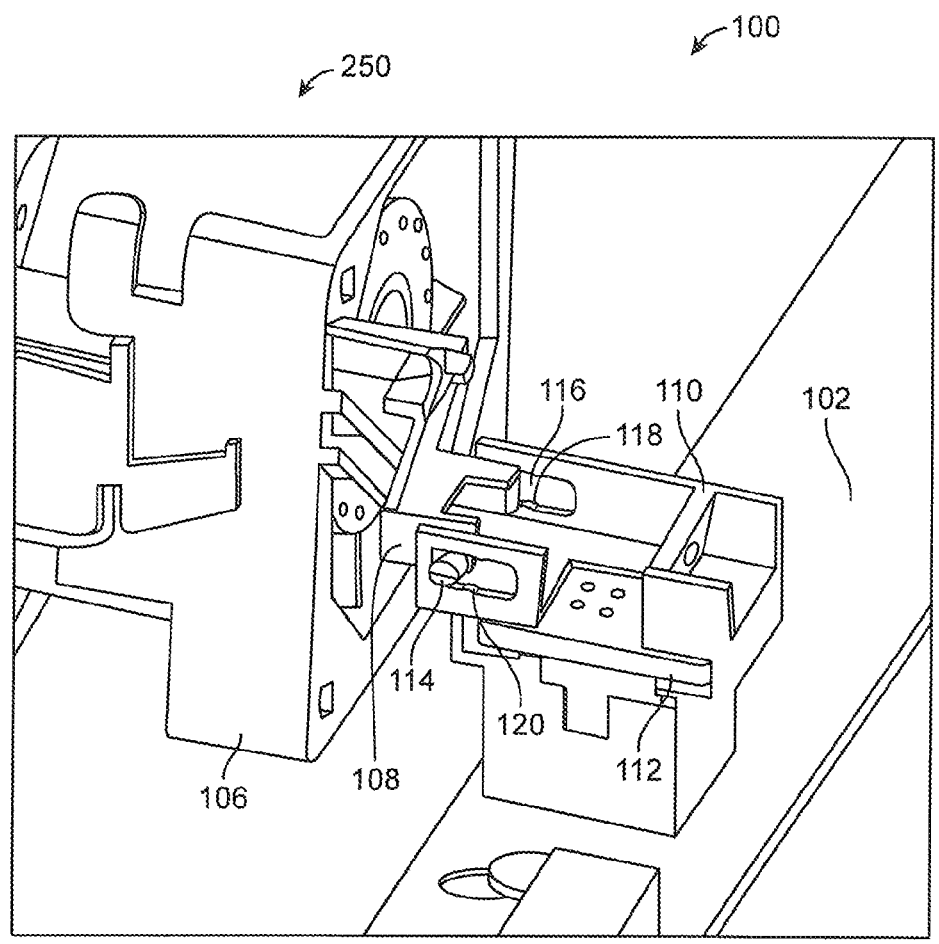
FIG. 6 is a detailed isometric view of portion BB of FIG. 5.

FIG. 5 illustrates an isometric view of an example embodiment of a component carrier assembly 100 in a third configuration 250. FIG. 6 illustrates a detailed isometric view of portion BB of FIG. 5. After transitioning from the second configuration, the assembly can be secured in the third configuration 250. In the third configuration 250, the component 104 and component carrier assembly 100 can be laterally displaced with respect to the connector assembly 109, and thus the component board 102. In the illustrated embodiment, the component 104 is displaced laterally with respect to the connector assembly 109 and along the longitudinal axis of the component 104 and component carrier assembly 100 after rotation. The displacement can be configured to allow a pre-defined distance to be provided between the component assembly 100 and the component board 102. The third configuration 250 can also serve to secure the position of the component carrier assembly 100, and thus the component 104. In particular, as the component 104 and component carrier assembly 100 are transitioned to the third configuration 250, the at least one protrusion 114 can move past the at least one ridge 120 formed within the at least one groove 116. The component carrier assembly 100 transitioning from the a substantially longitudinally aligned first configuration 150 to the third configuration, where the connecting member 110 has rotated and slid relative to the connector frame, can prevent structural deformation during the installation and assembly process.

Figure 7:
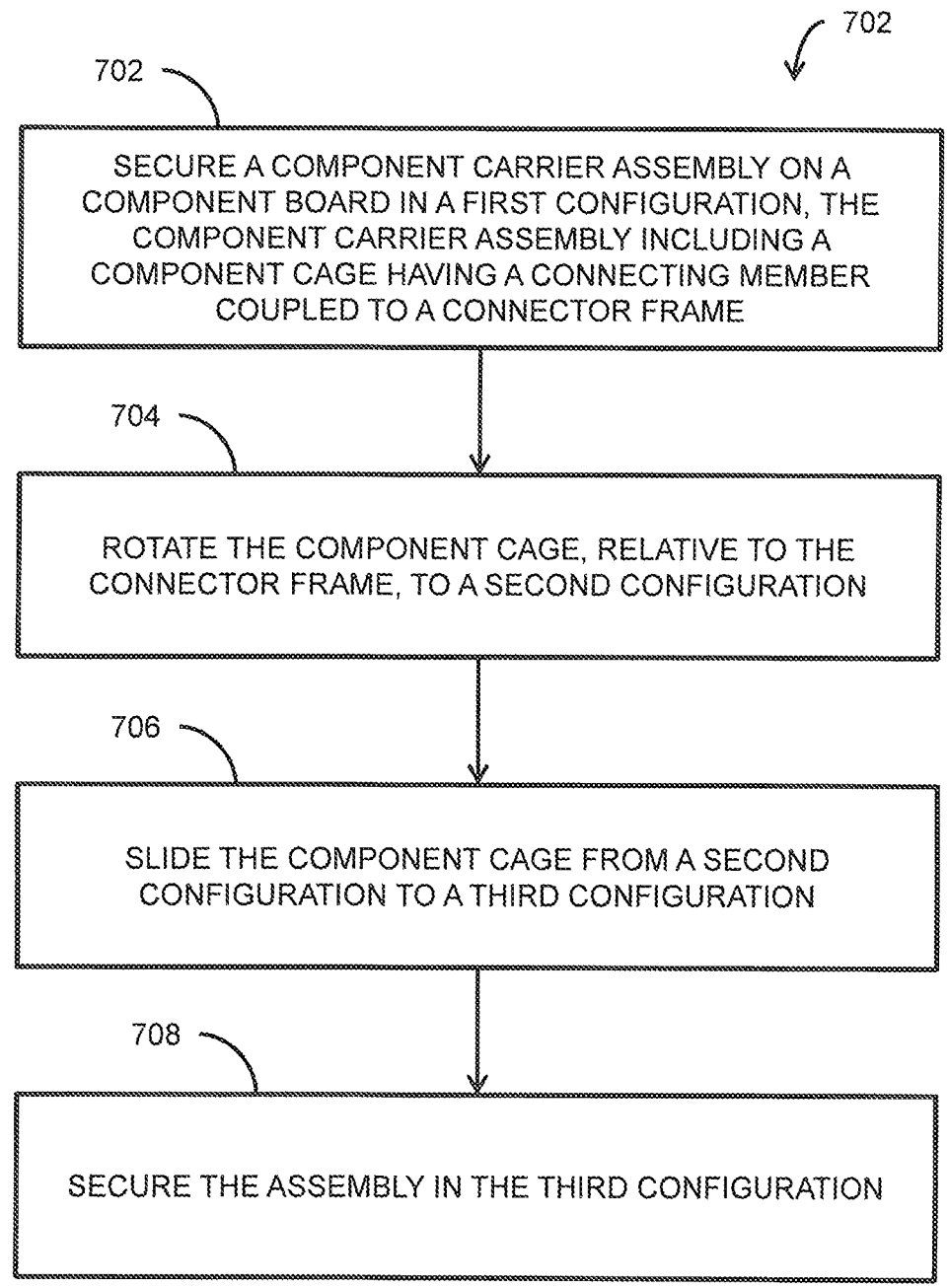
FIG. 7 is a flowchart of an example embodiment of a method for installing a fan carrier assembly on a component board.

Referring to FIG. 7, a flowchart is presented in accordance with an example embodiment. The example method 700 is provided by way of example, as there are a variety of ways to carry out the method. The method 700 described below can be carried out using the configurations illustrated in FIGS. 1-6, for example, and various elements of these figures are referenced in explaining example method 700. Each block shown in FIG. 7 represents one or more processes, methods or subroutines, carried out in the example method 700. Furthermore, the illustrated order of blocks is illustrative only and the order of the blocks can change according to the present disclosure. Additional blocks may be added or fewer blocks may be utilized, without departing from this disclosure. The example method 700 can begin at block 702.

At block 702, a component carrier assembly can be secured on a component board. The component carrier assembly can be in a first configuration and be aligned along a substantially longitudinal axis. The component carrier assembly can include a component bracket configured to receive a component to be installed. The component bracket can have a connecting member. The connecting member can be configured to operable couple to a connector frame. In at least one embodiment, the connecting member can have at least one protrusion extending therefrom configured to be received in a groove formed on the connector frame. As can be appreciated in FIG. 1, the component carrier assembly 100 can be secured to the component board 102 via the component coupler 112. The component carrier 100 can be first configuration, in the illustrated embodiment a substantially vertical orientation. The connecting member 108 can have protrusions 114 formed thereon configured to be received in grooves 116 formed on the connector frame 110.

At block 704, the component bracket can be rotated relative to the component connector frame to a second configuration. In at least one embodiment, the component bracket is rotated about 90 degrees from a substantially vertical orientation to a substantially horizontal orientation. The component bracket can rotate from longitudinal alignment with the connector frame to being substantially perpendicular to the connector frame. As can be appreciated in FIGS. 3 and 4, the bracket 106 and connecting member 108 can be rotated about the protrusion 114 received within the groove 116. The component carrier assembly can be substantially horizontal and parallel to the component board 102.

At block 706, the component bracket can slide relative to the connector frame from a second configuration to a third configuration. The component bracket can be laterally displaced with respect to the component board and the connector frame. As can be appreciated in FIGS. 5 and 6, the component carrier assembly 100 can be laterally displaced relative to the connector frame 110 and the protrusion 114 slides within the groove 116.

At block 708, the component bracket can be secured in the third configuration. The groove formed within connector frame can include a locking mechanism. The locking mechanism can be at least one ridge configured to secure the assembly in the third configuration. As the component bracket is slid relative to the connector frame (see block 706), the at least one protrusion can pass over the at least one ridge. The assembly can then be secured in the third configuration. As can further be appreciated in FIGS. 5 and 6, the component carrier assembly 100 can be secured in the third configuration 250 by the locking mechanism. The locking mechanism is a ridge 120 formed on the inner surface of the groove 116. The protrusion 114 passes over the ridge 120 as it is laterally displaced within the groove 116, thereby securing the component carrier assembly 100 in the third configuration 250.

It is believed the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiments of the disclosure.

What is claimed is:

1. An apparatus comprising:
   a assembly comprising a first mating element; and
   a connector component carrier assembly configured for supporting a component, the component carrier assembly comprising a connector communicatively coupled to the component and a second mating element,
   wherein the first mating element is configured to operably engage with the second mating element to rotationally and slidably couple the component carrier assembly to the connector assembly.

2. The apparatus of claim 1, wherein the component carrier assembly comprises a bracket configured to receive the component.

3. The apparatus of claim 1, wherein one of the first mating element and the second mating element comprises a connecting member having at least one protrusion extending therefrom, and wherein another of the first mating element and the second mating element comprises a connector frame having at least one groove formed therein, the groove configured to rotationally and slidingly receive the at least one protrusion.

4. The apparatus of claim 3, wherein the connecting member has two protrusions extending therefrom and the connector frame has two grooves formed therein, each groove configured to receive a one protrusion.

5. The apparatus of claim 3, wherein the at least one groove formed in the connector frame has a locking mechanism.

6. The apparatus of claim 5, wherein the locking mechanism is at least one ridge formed on the inner surface of the groove configured to allow the protrusion to pass over the at least one ridge thereby securing the protrusion.

7. The apparatus of claim 5, wherein locking mechanism is a plurality of ridges and the protrusion can be secured in a plurality of positions.

8. The apparatus of claim 5, wherein the locking mechanism is locking tab configured to be received in a corresponding locking groove on the connecting member.

9. A fan carrier apparatus comprising:
   a fan carrier assembly configured for supporting a fan, the fan carrier assembly comprising a first mating element; and
   a connector assembly comprising a connector communicatively coupled to the fan and a second mating element,
   wherein the first mating element is configured to operably engage with the second mating element to rotationally and slidably couple the fan carrier assembly to the connector assembly.

10. The fan carrier apparatus of claim 9, wherein the fan carrier assembly comprises a bracket configured to receive the fan.

11. The fan carrier apparatus of claim 9, further comprising a second bracket configured to receive an opposing end the housing.

12. The fan carrier apparatus of claim 9, wherein one of the first mating element and the second mating element comprises a connecting member having at least one protrusion extending therefrom, and wherein another of the first mating element and the second mating element comprises a connector frame having at least one groove formed therein, the groove configured to rotationally and slidingly receive the at least one protrusion.

13. The fan carrier apparatus of claim 12, wherein the locking mechanism is locking tab configured to be received in a corresponding locking groove on the connecting member.

14. The fan carrier apparatus of claim 12, wherein the connecting member has two protrusions extending therefrom and the connector frame has two grooves formed therein, each grove configured to receive a one protrusion.

15. The fan carrier apparatus of claim 12, wherein the at least one groove formed in the connector frame has a locking mechanism.

16. The fan carrier apparatus of claim 15, wherein the locking mechanism is at least one ridge formed on the inner surface of the groove configured to allow the protrusion to pass over the at least one ridge thereby securing the protrusion.

17. The fan carrier apparatus of claim 16, wherein locking mechanism is a plurality of ridges and the protrusion can be secured in a plurality of positions.

18. A method of installing a component carrier assembly, the method comprising:
   securing a component carrier assembly on a component board in a first configuration, wherein the component carrier assembly includes a component bracket having a connecting member coupled to a component connector frame;
   rotating the component bracket relative to the component connector frame to a second configuration; and
   sliding the component bracket from the second configuration to a third configuration.

19. The method of claim 18, wherein the connecting member has at least one protrusion configured to be received in at least one groove formed in the component connector frame, and the at least one groove is configured to allow the at least one protrusion to rotate between the first configuration and the second configuration.

20. The method of claim 18, wherein the component connector frame includes a locking member.

21. The method of claim 20, further comprising securing the component bracket in the third configuration via the locking member.

* * * * *